United States Patent [19]

Hilding et al.

[11] E Re. 30,071

[45] Reissued Aug. 14, 1979

[54] DRILL STRING ELEMENT HANDLING APPARATUS

[75] Inventors: Jonas O. A. Hilding; Jan E. Persson, both of Nacka, Sweden

[73] Assignee: Atlas Copco Aktiebolag, Nacka, Sweden

[21] Appl. No.: 809,708

[22] Filed: Jun. 24, 1977

Related U.S. Patent Documents

Reissue of:

[64] Patent No.: 3,986,569
Issued: Oct. 19, 1976
Appl. No.: 533,134
Filed: Dec. 16, 1974

[30] Foreign Application Priority Data

Dec. 21, 1973 [SE] Sweden ..... 7317338

[51] Int. Cl.[2] ..... E21B 19/14

[52] U.S. Cl. ..... 175/52; 173/164; 175/85; 175/209; 211/60 S; 414/22

[58] Field of Search ..... 175/52, 85, 62, 122, 175/209; 166/77.5; 173/164, 141; 81/57.14, 57.16, 57.28, 57.34, 57.32, 57.2; 308/3.9; 214/2.5; 211/60 S

[56] References Cited

U.S. PATENT DOCUMENTS

| | | | |
|---|---|---|---|
| 2,107,552 | 2/1938 | Smith | 175/209 |
| 2,669,431 | 2/1954 | Crowell | 175/8 X |
| 2,734,723 | 2/1956 | Larcen | 308/3.9 X |
| 2,972,388 | 2/1961 | Thornburg | 175/52 |
| 2,976,943 | 3/1961 | Curtis | 173/164 |
| 3,158,212 | 11/1964 | Fanshawe et al. | 175/85 |
| 3,177,944 | 4/1965 | Knights | 175/85 X |
| 3,231,318 | 1/1966 | Ytterfors | 38/3.9 |
| 3,286,777 | 11/1966 | Gyongyosi | 175/85 X |
| 3,328,052 | 6/1967 | Nilsson | 308/3.9 X |
| 3,441,323 | 4/1969 | Vincent et al. | 308/3.9 |
| 3,506,075 | 4/1970 | Attebo | 175/85 X |
| 3,612,190 | 10/1971 | Wills | 308/3.9 X |
| 3,976,149 | 8/1976 | Granholm | 175/52 |

*Primary Examiner*—Ernest R. Purser
*Assistant Examiner*—Richard E. Favreau
*Attorney, Agent, or Firm*—Frishauf, Holtz, Goodman & Woodward

[57] ABSTRACT

An arrangement for the handling of drill string elements, such as tubes or rods, in drill rigs, comprising means for transferring the drill string elements between a magazine and the drill string axis, a drill string centralizer at the front end of an elongated support for guiding the drill string, a spinning device on said transferring means for gripping and rotating a drill string element, said means being adapted to axially displace the drill string element during rotation thereof, and a sleeve brake mounted on the drilling machine for nonrotatably holding a coupling sleeve when the adapter of the drilling machine is disconnected from the drill string.

22 Claims, 20 Drawing Figures

14
15
221
24
VIII
VIII
26
25
27
12
26
II
II
23
IV
IV
22
13
290
20
11
10
16
21
17
18
19

201
271
267
269
270
268
262
225
264
260
259
261
263
21
268
271
266
267
XIII
256
263
XIII
265
257
254
258
L2
255
252
251
14
201
20
14
253
21

DRILL STRING ELEMENT HANDLING APPARATUS

Matter enclosed in heavy brackets [ ] appears in the original patent but forms no part of this reissue specification; matter printed in italics indicates the additions made by reissue.

This invention relates to an arrangement for transferring drill rods or drill pipes to and fro between a magazine and a drill string made up by these rods or pipes and for connecting and disconnecting the rods or pipes, comprising a spinning device for gripping and rotating the drill rod. The spinning device is movably mounted for transferring the drill rod along a path between the magazine and the drill string axis at the movement thereof.

Rock drilling rigs with arrangements for automatic handling drill pipes are previously known. In one known rig, by way of example, the drill pipes are placed in an arcuate magazine and are transferred to the drill axis by means of a swingable gripping arm. In another known drill rig the pipe rack itself is movably mounted on the framing. In both of these previously known constructions the rotary drive unit of the drilling machine is used for the assembling and disassembling of the drill pipes. Such constructions are disclosed for instance in U.S. Pat. No. 3,506,075 and U.S. Pat. No. 2,972,388. In still another drill rig, disclosed in U.S. Pat. No. 3,177,944, the drill pipes are placed in a horizontal magazine and are movable to a vertical position parallel with the drill axis by means of two gripping arms. A swingable arm with a gripping means designed as three rollers resting against the pipes is arranged to transfer the pipes to the drill axis. The gripping arm is placed on a mounting which can be raised and lowered by mans of an hydraulic cylinder for attaining the axial displacement between two drill pipes which is necessary during assembling and disassembling.

An object of the present invention is to provide an arrangement for handling drill rods or drill pipes in a simplified, cheaper and more rapid manner when compared with known arrangements, whereby the dead time in connection with the drilling can be substantially reduced.

The above and other purposes of the invention will become obvious from the following description and from the accompanying drawings in which one embodiment of the invention is shown by way of example. It should be understood that this embodiment is only illustrative of the invention and that various modifications thereof may be made within the scope of the claims following hereinafter.

DETAILED DESCRIPTION

Figure 1:
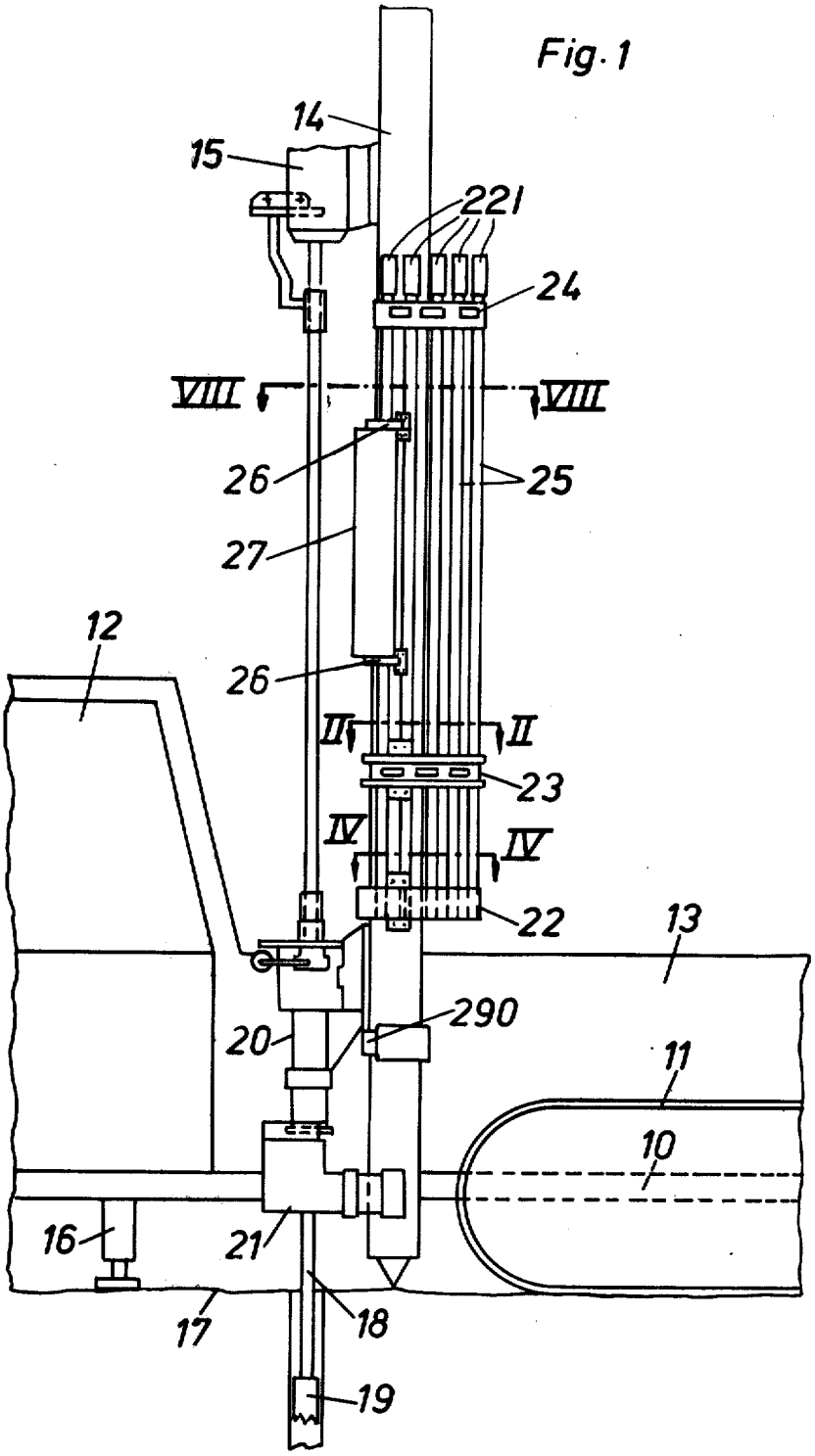
FIG. 1 shows diagrammatically a side view of a crawler mounted rock drilling rig with a rod handling system according to the invention.
Figure 20:
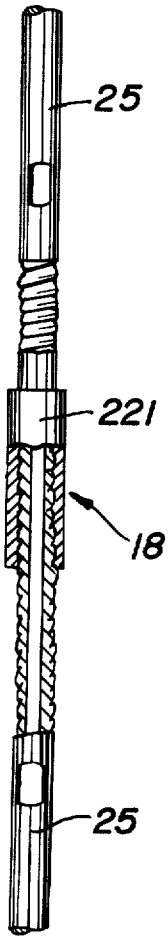
FIG. 20 shows a pair of drill rods with a coupling sleeve therebetween.

In FIG. 1, a drill rig is diagrammatically shown, having a chassis 10, crawlers 11, an operator's cab 12, a machinery housing 13 accommodating a Diesel engine, hydraulic pumps and a [compressor] *compressor* unit, and a feed bar 14. A rock drilling machine 15, preferably hydraulic, is in known manner movable along the feed bar 14. During drilling, the chassis 10 is raised from the ground 17 by means of hydraulic levelling jacks 16. A magazine for drill rods (also called extension rods) 25 comprising three axially spaced members 22, 23 and 24 is mounted beside the feed bar 14. The drill rods (i.e., extension rods) 25, are moved one by one between the magazine and the drill axis by means of a swingable transferring arm 26 with a spinning device 27 mounted on the outer end thereof. At the front end of the feed bar 14 there is a drill rod centralizer 20 for a string 18 of coupled extension rods. The drill rod centralizer 20 is mounted on a slide which is freely slidable along the feed bar. In FIG. 1, the drill rod centralizer is shown in a rear position where it can be locked by means of hydraulically operated lugs 290. At either side of the feed bar there is a drill bit changing device 21 swingably journalled in such a way that it can be swung to the drill axis, when the drill rod centralizer 20 is in the shown position and the drill bit 19 is drawn up thereinto. The drill rods (or extension rods) 25 have threaded ends, as is conventional, for threaded engagement with a coupling sleeve 221 (FIG. 20) to connect drill rods end-to-end to form a drill string 18.

Figure 2:
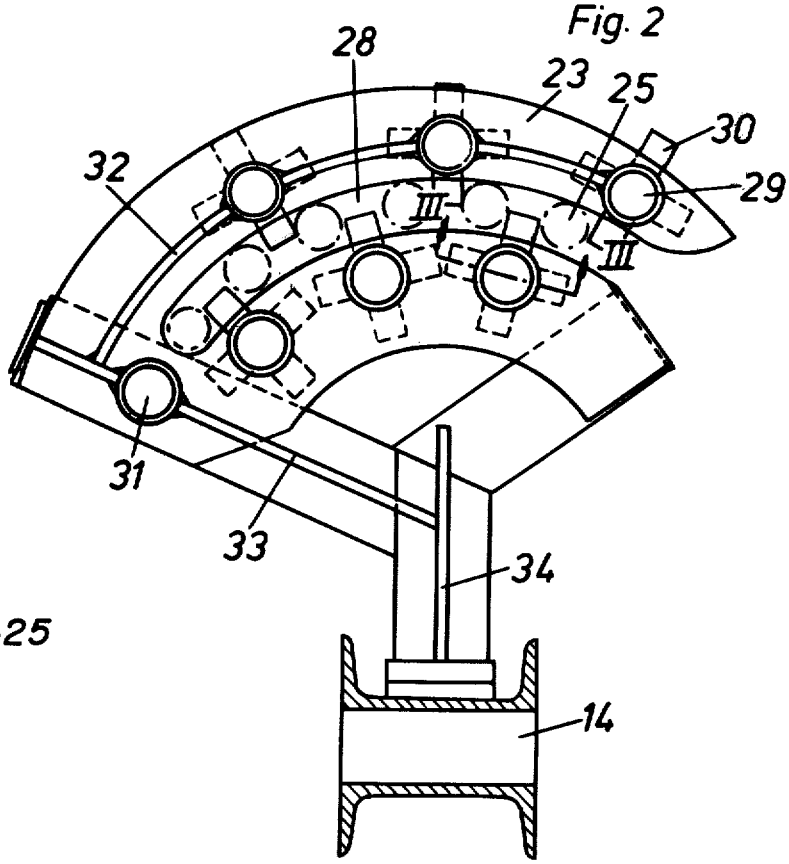
FIG. 2 shows a section through a magazine for drill rods, taken along the line II—II in FIG. 1.

As may be seen in FIG. 2 the magazine member 23 attached to the feed bar 14 is provided with an arcuate channel 28. A bar 31 is placed outside the bottom of the channel on the extension of said circle arc extending between the upper member 24 of the magazine and the bottom 22. The magazine is stiffened by [eans] *means* of vertical flanges 32, 33 and 34. On both sides of the channel 28 turnstiles 29 are rotatably journalled. Each turnstile is provided with four pins or wings 30 each of which separates two consecutive rods. The turnstiles 29 are journalled alternately on the one side and on the other of the channel from the opening to the bottom thereof. The turnstiles 29 are rotated by the rods 25 during the transferring of the rods into or out of the magazine.

Figure 3:
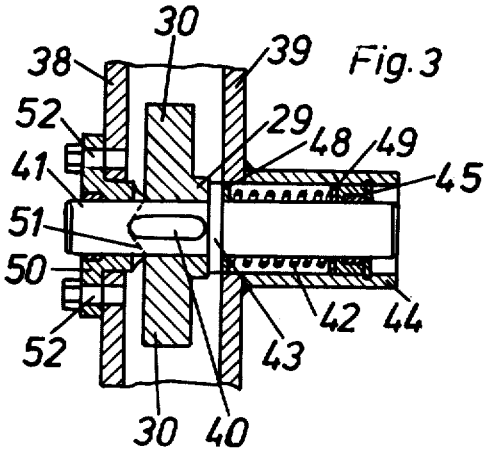
FIG. 3 shows a section through a turnstile separating two consecutive rods in the magazine, taken along the line III—III in FIG. 2.

As evident from the section through a turnstile 29 shown in FIG. 3, the latter is journalled between two parallel plates 38 and 39. The turnstille 29 is attached to a shaft 41 by means of a wedge 40. A tube 44 is affixed to the plate 39. Between a collar 43 on the shaft 41 and a lock ring 45 fastened in the tube 44 there is provided a spring 42. At both sides of the spring between the latter and respectively the collar 43 and the lock ring 45 there are slide rings 48 and 49 respectively. A plate 50 providing a bearing bushing is attached to the plate 38 by means of bolts 52. The end of the plate 50 which faces the turnstile 29 is provided with a waved cam profile 51. The wedge 40 extends before the turnstile 29 and is biased against the cam profile 51 by the spring 42. The cam profile 51 is provided with four tops and four bottoms. When the turnstiles 29 are in the position shown in FIGS. 2 and 3 the wedge 40 rests against a bottom in the cam profile 51. If a rod 25 is moved into or out of the magazine, the rod will turn the turnstile 29 by the contact with a pin 30. The wedge 40, then, will slide along the cam profile 51 and contract the spring 42. The turnstile 29 is turned by the rod until the wedge 40 passes a top on the cam profile 51. The continued turning of the turnstile until the wedge reaches the bottom immediately following in the cam profile is carried out by extension of the contracted spring 42. The spring force is so chosen that it is great enough to prevent the rods from falling unintentionally out of the magazine, for instance when the feed bar 14 is inclined. The upper member 24 of the magazine is designed in the same way as the member 23.

Figure 4:
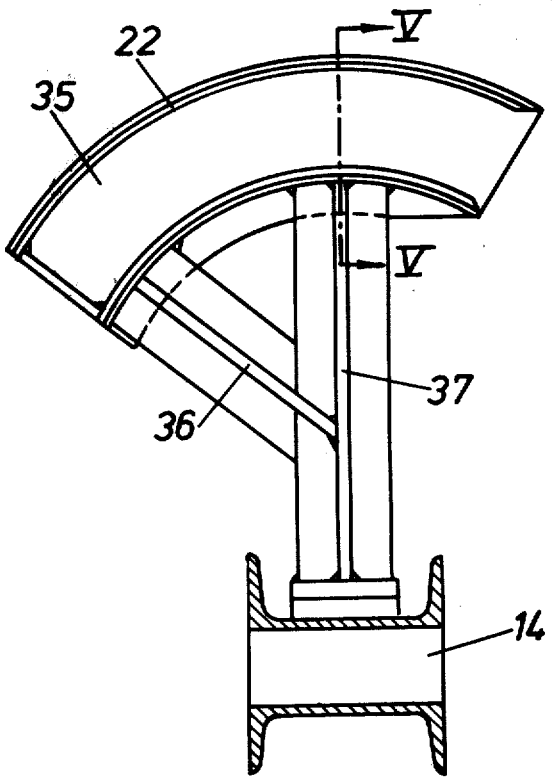
FIG. 4 shows the magazine bottom, taken along the line IV—IV in FIG. 1.
Figure 5:
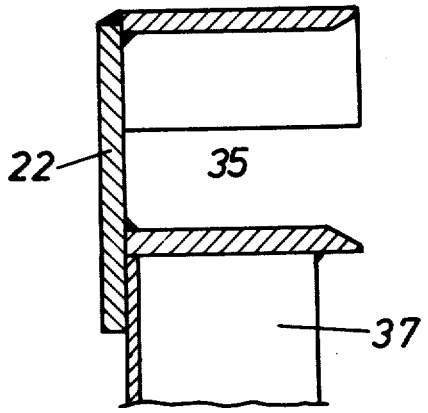
FIG. 5 shows a section through the magazine bottom, taken along the line V—V in FIG. 4.

In FIGS. 4 and 5, the bottom member 22 of the magazine is shown. The bottom member, which in conformity with the members 23 ad 24 of the magazine is attached to the feed bar 14, is stiffened by means of flanges 36 and 37. The rods are stored in an up-right position standing against the plane bottom surface in an arcuate channel 35 designed with an U-shaped cross section.

Figure 6:
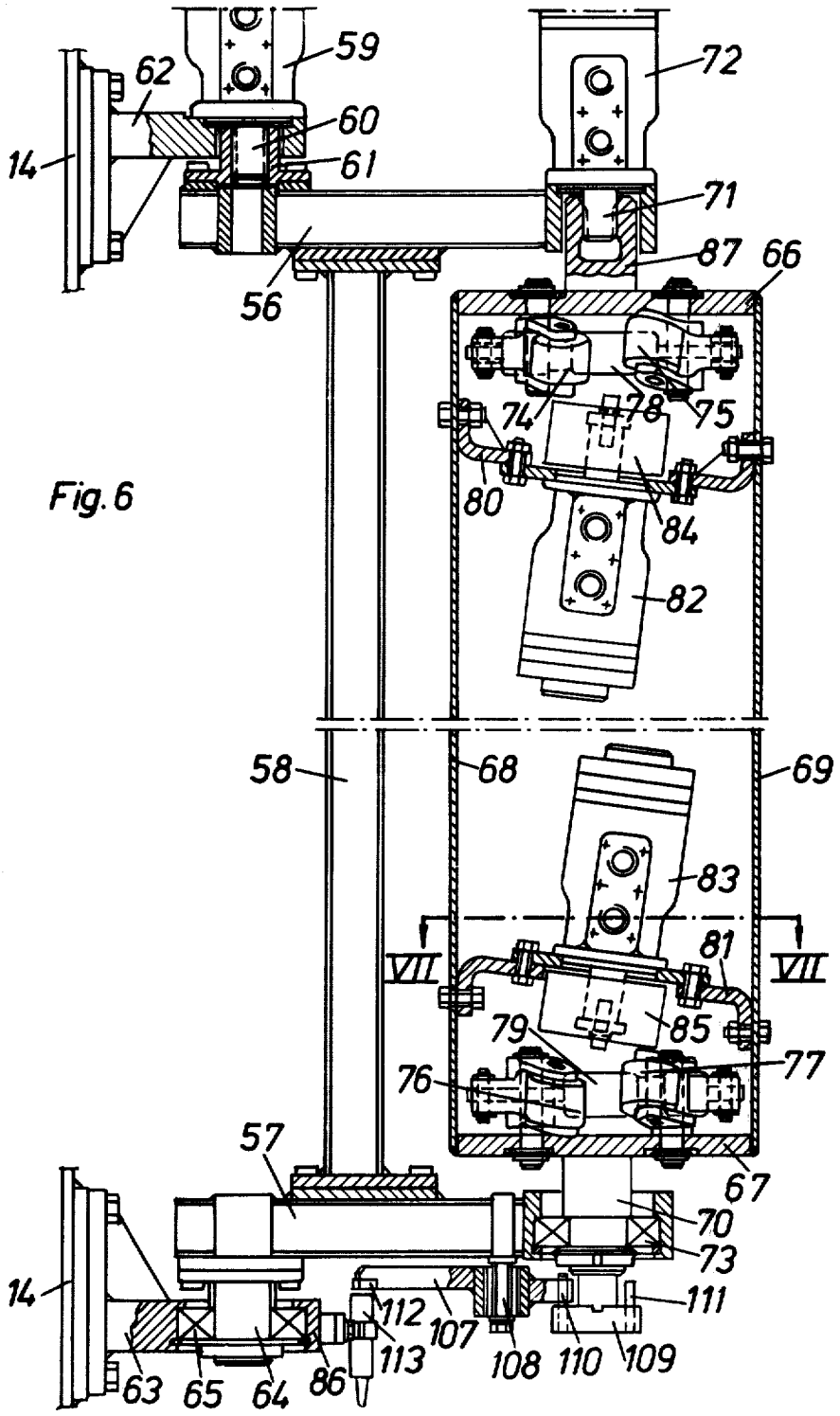
FIG. 6 is a longitudinal section showing a swingable transferring arm with rod-gripping tongs.

In FIG. 6, the longitudinal section through the transferring arm 26 with the spinning device 27 shows that the transferring arm comprises two arms 56 and 57 perpendicular to the feed bar 14, which arms are mutually connected by a bar 58. A trunnion 61 provided with internal splines is attached to the arm 56. A pivot 60 of an hydraulic motor 59 is stuck into the trunnion 61, which pivot is provided with splines. The motor 59 is mounted on a bracket 62 which is fastened with screws to the feed bar 14. A pivot 64 is attached to the arm 57. The pivot 64 is journalled in a bearing 65 which is mounted in a bracket 63, which bracket is fastened with screws to the feed bar 14. The spinning device 27 [comprise] *comprises* two rectangular plates 66 and 67 which are connected to each other by side pieces 68 and 69. A trunnion 87 provided with internal splines is attached to the plate 66. A pivot 71 of an hydraulic motor 72 is stuck into the trunnion, which pivot is provided with splines. The motor 72 is mounted on the arm 56. A pivot 70 is attached to the lower plate 67. This pivot is journalled in a bearing 73 which is mounted in a journal casing on the arm 57. Two rollers 76 and 77 are swingably attached to the plate 67.

Figure 7:
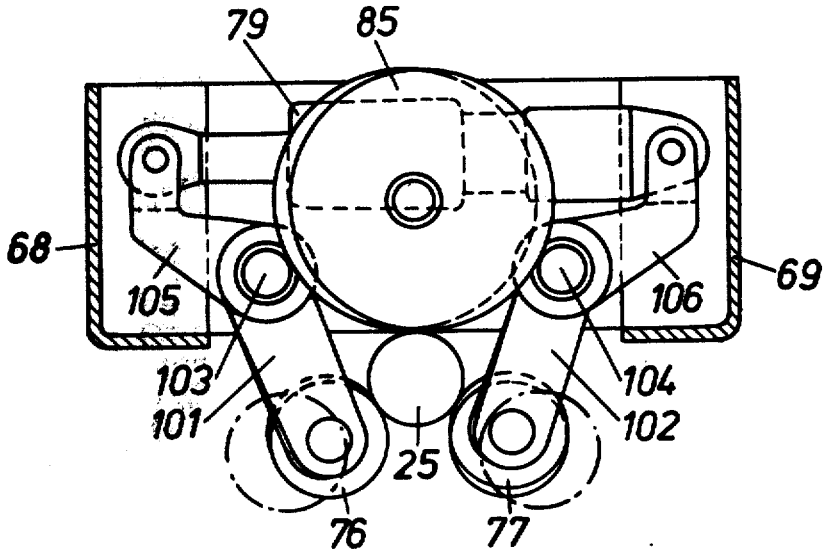
FIG. 7 shows a fragmentary section through the gripping tongs, taken along the line VII—VII in FIG. 6.

As may be seen in FIG. 7 the rollers 76 and 77 respectively are journalled on the outer end of arms respectively 101 and 102. These arms are swingable around shafts 103 and 104, which are mounted on the plate 67. The arms 101 and 102 are swung by means of a double acting hydraulic cylinder 79, the movement of which is transferred to the arms 101 and 102 respectively via link arms respectively 105 and 106.

A mounting plate 81 extends between the side pieces 68 and 69, which mounting plate carries a reversible hydraulic motor 83. A roller 85 is attached to the pivot of the motor 83. The axes of the rollers 76, 77 and 85 are inclined in relation to the drill axis, whereby the angle between each of the axes of the rollers and the drill axis is equal to the pitch angle of the thread of the extension rod. Rollers 74 and 75 are swingably mounted on the plate 66 by means of an hydraulic cylinder 78. An hydraulic motor 82 is mounted on a mounting plate 80 extending between the side pieces 68 and 69. The motor 82 drives reversibly a roller 84. The rollers 74, 75 84 and 76, 77, 85 respectively form axially spaced gripping tongs for a drill rod.

Figure 8:
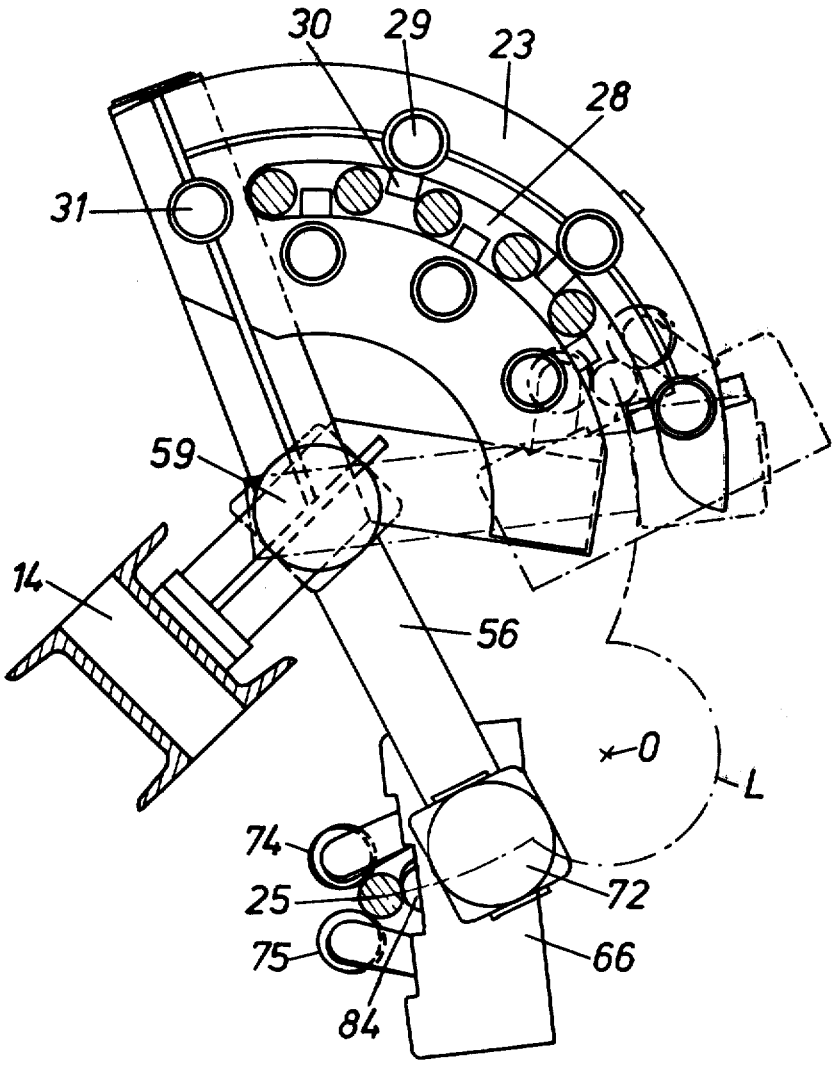
FIG. 8 shows a top view of the transferring arm and the magazine, taken along the line VIII—VIII in FIG. 1.

In FIG. 8, the path L is shown along which a drill rod 25 moves between the magazine and the drill axis. The arm 56 with the rollers 74, 75 and 84 gripping a drill rod 25, is swung by means of the motor 59 until the axis of the motor 72 reaches the point 0. The motor 59, then, is stopped and the motor 72 starts turning the frame 66, 67, 68 and 69, whereby the rod 25 moves along a circular arc to the side of the arm 56 which faces the magazine member 23. The motor 72 is stopped and, at the same time, the motor 59 continues swinging the arm 56, whereby the rod 25 is moved into the channel 28. The rod 25 is moved as far as possible into the channel 28, in FIG. 8 shown with chain-dotted lines, where a continued movement is prevented by the rod being in the magazine and by the pins 30 of the turnstiles 29 positioned between the rods. Adjustable set screws, not shown, for adjusting the moving path L of the drill rod are provided on the arm 56 on the one hand at the swinging centre of the arm and on the other at the outer end thereof, these set screws being intended to cooperate with stop means mounted on the feed bar and on the plate 66 respectively for determining respectively the end position of the swinging of the [aam] *arm* 56 and the end position of the turning of the gripping tongs.

Figure 9:
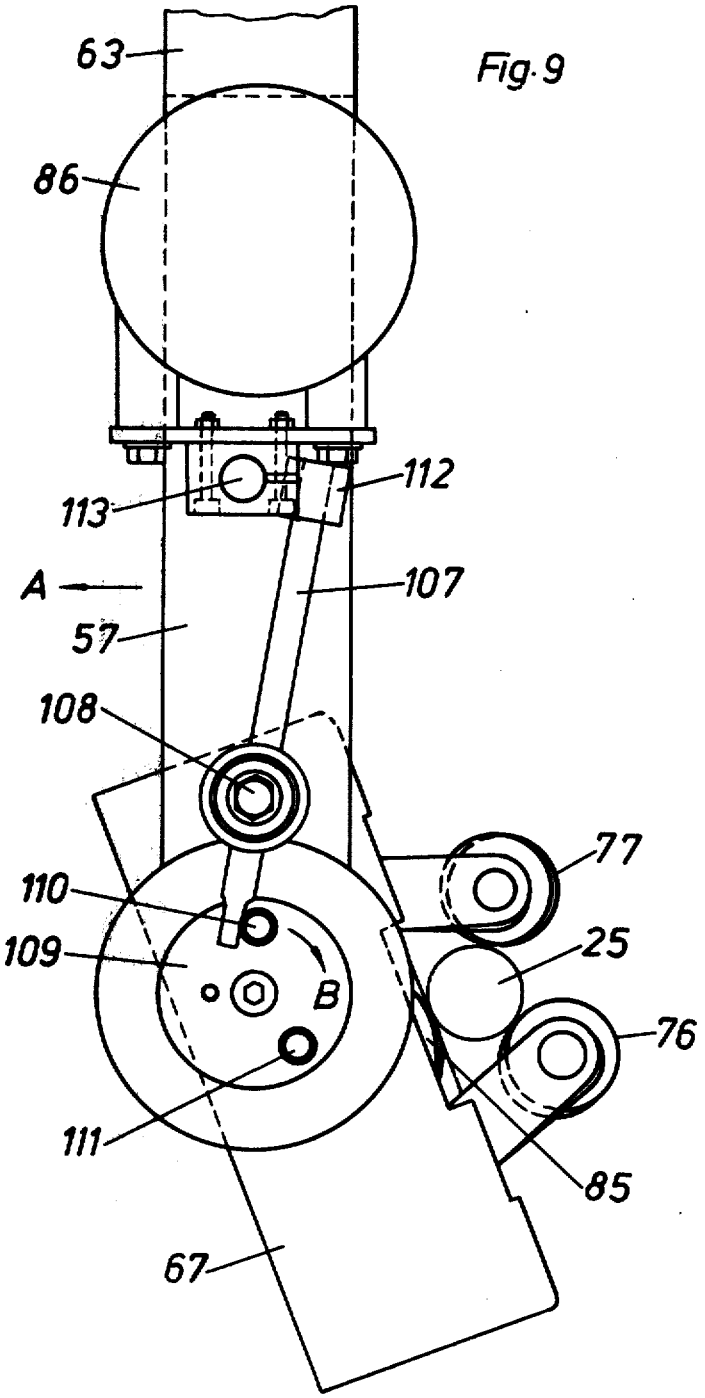
FIG. 9 is a bottom view of the transferring arm system in FIG. 6 showing how the gripping tongs are arranged to be turned at the swinging of the transferring arm.
Figure 18:
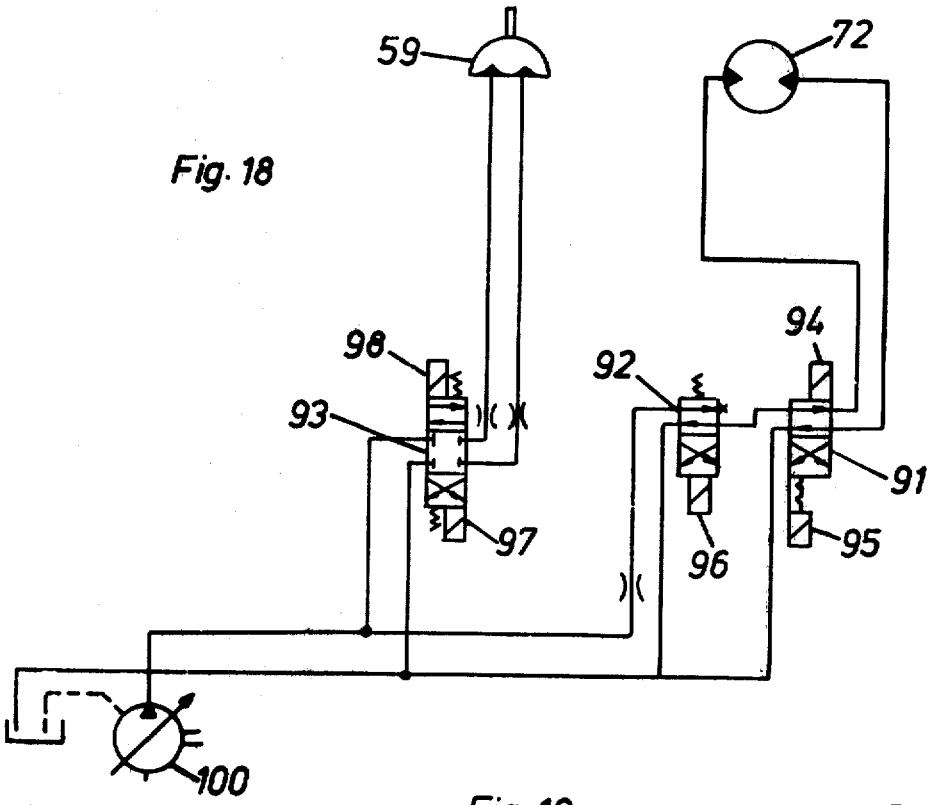
FIGS. 18 and 19 show diagrammatically respectively the hydraulic and the electric control circuit for the transferring arm and the gripping tongs.
Figure 19:
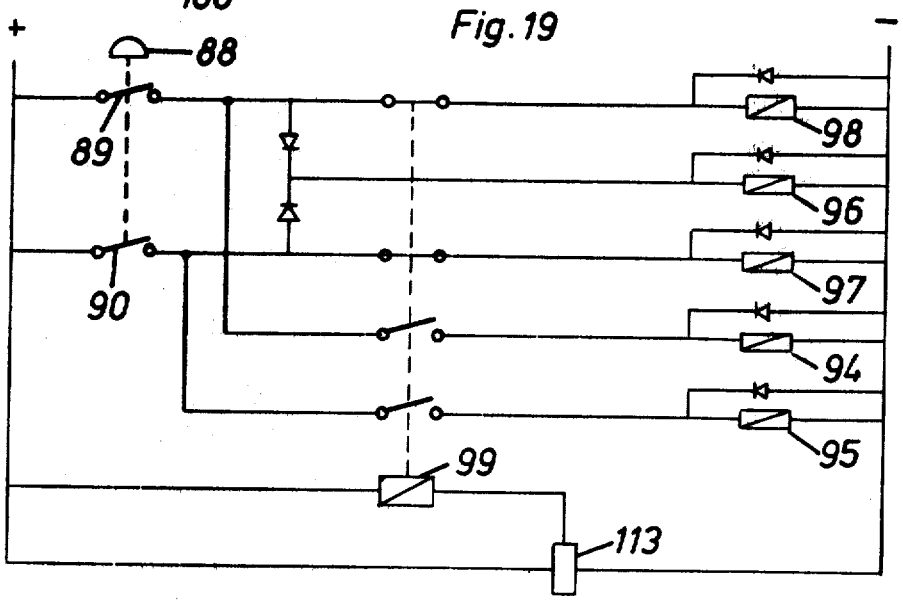

In FIG. 9, the control means are shown for the turning of the spinning device 27 on the transferring arm 26. On the underneath side of the arm 57 a resiliently swingable arm 107 *is* journalled in such a way that it strives to return to an [intial] *initial* position upon being swung. The arm 107 carries a metal plate 112, which will cover a sensor 113 with a mutual spacing at the swinging of the arm. The sensor, which emits a signal at the covering, is attached to the journal casing 86 on the bracket 63. The outer end of the pivot 70 carries a round plate 109. Two pins 110 and 111 are attached to the plate. If the arm 57 is swung in the direction of the arrow A the plate 112 will partly cover the sensor 113. In this position the pivot of the motor 72 has reached the point 0 in FIG. 8. The motor 59 is stopped by a signal emitted from the sensor 113, which signal besides is used to start the motor 72. The latter rotates the plate 109 in the direction of the arrow B until the pin 111 abuts the arm 107. The arm 107, then is swung in the counter clockwise direction by means of which the mutual covering of the sensor members 112 and 113 ceases. The signal emitted from the sensor starts the motor 59, whereby the transferring arm continues to swing. When the arm 57 is swung in the opposite direction, the pin 110 will control the sensor in analogous manner. In FIGS. 18 and 19, the hydraulic and the electric control circuit respectively for the transferring arm 26 and the spinning device 27 are shown diagramatically. A contact breaker 89 and a contact breaker 90 can be actuated individually by means of a manipulator 88. If a drill rod is to be transferred from the magazine to the drill axis the contact breaker 89 is actuated. An electromagnet 98, then, will adjust the valve 93 in such a way that pressure fluid from the pump 100 is conducted to the motor 59, whereby the swinging of the arm 57 starts. When the plate 112 has reached the sensor 113 a signal is emitted therefrom, which signal actuates a relay 99. The latter cuts the tension to the magnet 98, whereby the valve 93 is readjusted and the motor 59 stops. At the same time the relay 99 closes the circuit through the magnet 94, whereby the valve 91 is adjusted. Since the magnet 96 has adjusted the valve 92 pressure fluid will be conducted to the motor 72, by which the latter starts to turn the gripping tongs in a clock-wise direction according to the arrow B in FIG. 9. The gripping tongs are turned until they abut mechanical stopping means, not shown. When the plate 112 is moved away from the sensor 113 by the pin 111, the magnet 98 once again is put under tension, by means of which the valve 93 again is adjusted and the motor 59 continues to swing the arm 57 until the drill rod reaches the drill axis.

When a drill rod is to be transferred from the drill axis to the magazine, the contact breaker 90 is actuated. The magnet 97, then, will adjust the valve 93 in the opposite direction, by means of which the motor 59 starts to swing the arm 57 towards the magazine. When the plate 112 has reached the sensor 113 the relay 99 is actuated once again, whereby the magnet 97 becomes dead and the motor 59 stops. At the same time the magnet 95 is put under tension, by means of which the valve 91 is adjusted in such a way that the motor 72 starts to turn the gripping tongs in the counter clockwise direction, FIG. 9. The gripping tongs are turned until they abut mechanical stopping means, not shown. When the gripping tongs have been turned so much that the plate 112 is moved away from the sensor 113 by the pin 110, time the magnet 97 is put under tension, by means of which the valve 93 once again is adjusted and the motor 59 continues to swing the arm 57 until the drill rod has reached the magazine.

Figure 14:
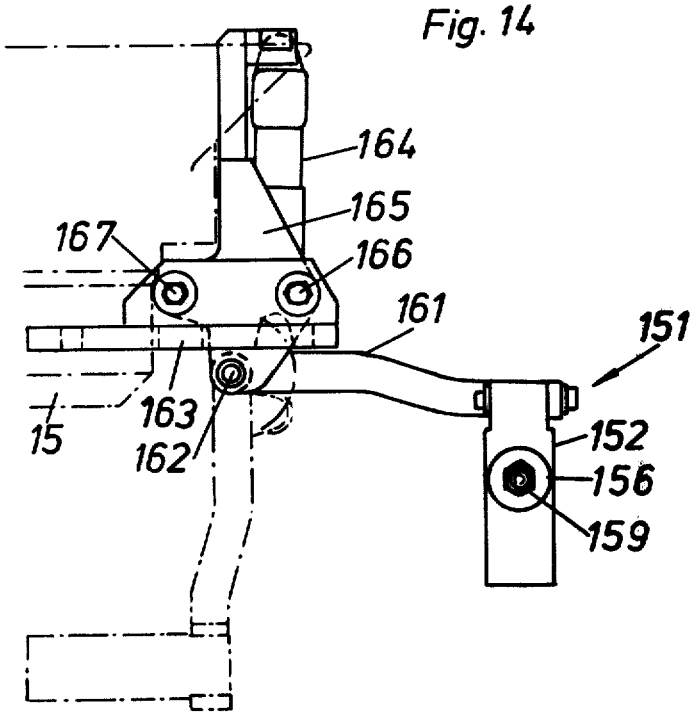
FIG. 14 shows a side view of a coupling sleeve brake arranged at the front end of the rock drilling machine.
Figure 15:
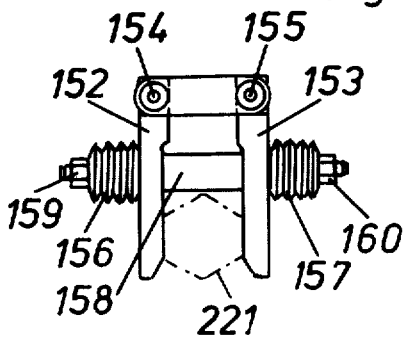
FIG. 15 shows a top view of the sleeve brake.

In the embodiment shown as an example the extension rods are coupled by using detachable coupling sleeves. At disassembling it is therefore necessary to make sure that the right thread connection in the sleeve is loosened. A sleeve brake 151 is therefore mounted on the front end of the rock drilling machine 15. The sleeve brake (FIGS. 14 and 15) comprises two fork legs 152, 153 which rest against diametrically opposed sides of a sleeve 221 at the braking thereof. Besides hexagonal sleeves, shown in FIG. 15, also round sleeves can be used. The fork legs 152, 153 are swingable around shafts 154, 155 mounted on the outer end of an arm 161. The arm 161 is swingable around a shaft 162 in a bracket 165 by means of a cylinder 164. The bracket 165 is supported by two shafts 166, 167 mounted on a plate 163 which is attached to the front end of the rock drilling machine 15. The shafts 166, 167 are preferably surrounded by resilient bushings so that the impulse waves from the impactor of the rock drilling machine 15 are not to be transmitted to the sleeve brake 151. A shaft 158 extends transversally through the fork legs 152, 153. The fork legs can be moved away from each other against the action of springs 156, 157 mounted on the shaft 158. The springs are locked by nuts 159, 160. At drilling, the sleeve brake 151 is in the position shown with continuous lines in FIG. 14. When the adapter of the rock drilling machine is to be unscrewed out of a coupling sleeve, the direction of rotation of the rock drilling machine is reversed. During a reversed rotation of the rock drilling machine the sleeve brake 151 is swung automatically to the position shown with chain-dotted lines in FIG. 14 by means of the cylinder 164 *actuated by the supply pump 100 and reverse rotation sensing means 300.* The fork legs 152, 153, then, wil lock the sleeve against rotation, by which is safeguarded that the sleeve remains on the drill rod.

Figure 11:
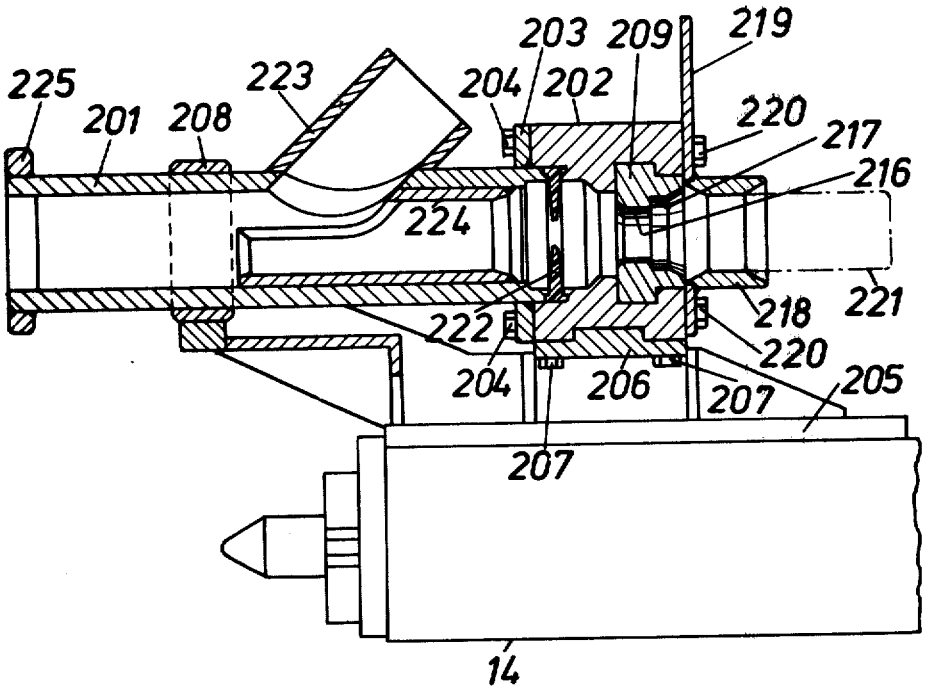
FIG. 11 shows a longitudinal section through the drill steel centralizer, taken along the line XI—XI in FIG. 10.
Figure 10:
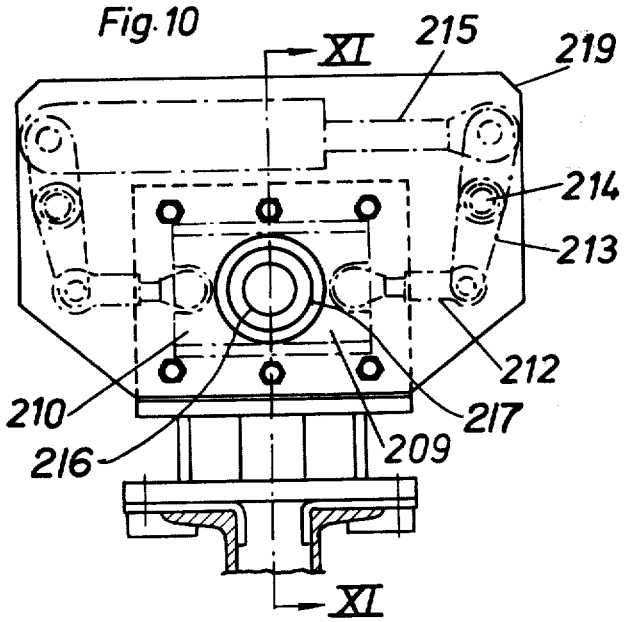
FIG. 10 shows a top view of a drill steel centralizer.

As evident from the longitudinal section through the drill rod centralizer 20 shown in FIG. 11 the latter consists of substantially two members, a tubular member 201 and a prism shaped member 202. A flange 203 is welded to the upper part of the tube 201. The flange 203 is connected to the member 202 by means of screws 204. The drill rod centralizer is mounted on a slide 205, which is slidable along the feed bar 14. A plate 206 is welded to the upper part of the slide. The member 202 is attached to the plate 206 by means of screws 207. The tubular member 201 is attached to the lower part of the slide 205 by means of a clamp 208. A flange 225 is attached to the lower most portion of the tube 201. Two co-operating hydraulically controlled jaws 209 and 210 are slidably mounted in the prism shaped member 202. The jaw 209 is movable (FIG. 10) by means of an arm 212, a second arm 213 pivotally connected to said arm, which second arm is swingable about a shaft 214 and by means of a piston rod 215 of a cylinder, which piston rod is pivotally connected to the opposite end of the arm 213. In a position where brought together the jaws 209 and 210 provide between themselves a first cylindrical part 216, the diameter of which is a little larger than that of the drill rod. A second cylindrical part 217 has a diameter which is a little smaller then the outer diameter of a coupling sleeve 221 which connects two drills rods to each other. A plate 219 is fastened to the upper side of the member 202 by means of screws 220. A cylindrical sleeve 218 is welded to the plate 219. The sleeve 218 has substantially the same inner diameter as the outer diameter of the coupling sleeve 221. A seal ring 222, preferably of a plastic material, is inserted at the upper part of the tube 201 between said part and the member 202. A second tube 223 is welded to the envelope surface of the tube 201 at about the middle thereof. Inside the tube 201 between the upper part thereof and the tube 223, there is a sleeve 224 firmly attached to the tube 201. The inner diameter of the sleeve 224 accords substantially with the outer diameter of the coupling sleeve 221. The tube 201 is intended to guide the drill bit at the collaring of a new hole, for which reason the inner diameter of the tube substantially accords with the outer diameter of the drill bit.

Figure 17:
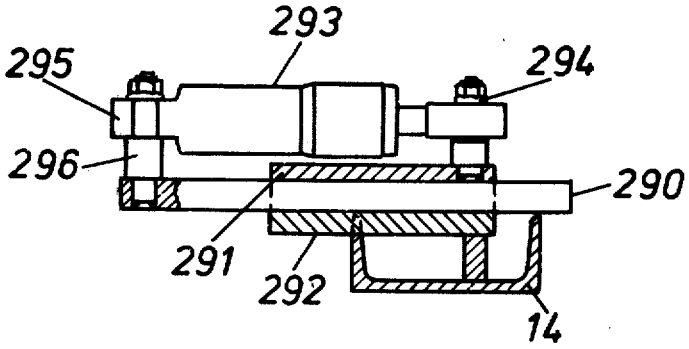
FIG. 17 shows a section through the stop lug, taken along the line XVII—XVII in FIG. 16.
Figure 16:
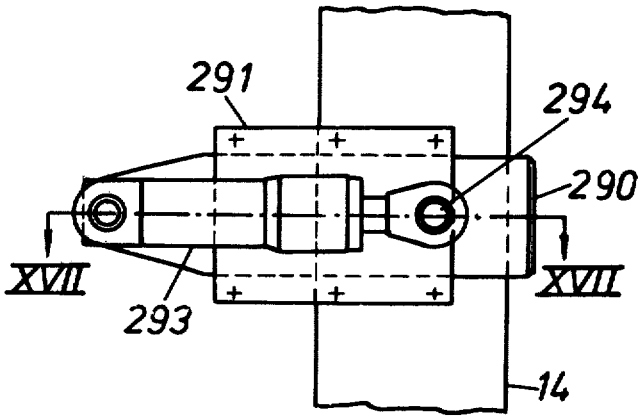
FIG. 16 shows a side view of a stop lug for the drill steel centralizer.

On either side of the feed bar 14 (FIG. 16), there is a stop lug 290 for the slide 205 of the drill rod centralizer. The stop lug 290 is guided between two parallel plates 291, 292 fastened with screws to each other. The plate 292 is attached to the feed bar 14. The piston rod of a cylinder 293 is pivotally connected to the plate 291 by means of a shaft 294. The rear part 295 of the cylinder is pivotally connected to the stop lug 290 by means of a shaft 296. In the projecting position shown in FIGS. 16 and 17 the stop lug is intended to co-operate with a lower part of the slide 205 of the drill rod centralizer thereby locking the slide against forward displacement.

Figures 12, 13:
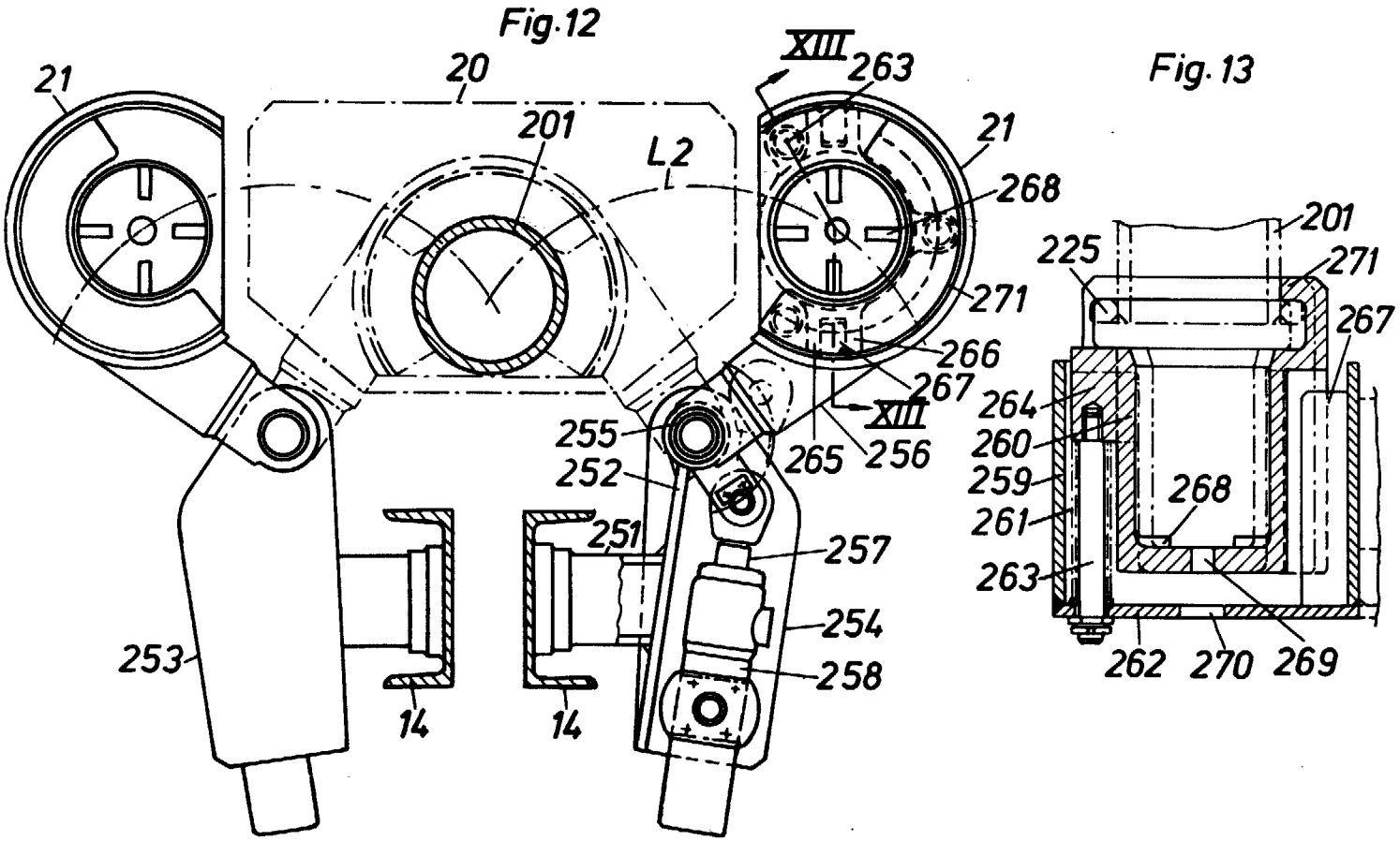
FIG. 12 shows a top view of drill bit changing devices arranged at both sides of the feed bar.
FIG. 13 is a longitudinal section through a drill bit changing device, taken along the line XIII—XIII in FIG. 12.

In FIG. 12, a top view is shown of the devices 21 for exchanging the drill bit arranged symmetrically at either side of the feed bar 14. An arm 251 is attached to the feed bar 14. The other end of said arm is connected to a plate 252. The plate 252 extends between two plates, an upper plate 253 and a lower plate 254, located in planes normal to the longitudinal direction of the feed bar. A bearing bushing 255 for a curved arm 256 is attached to the one end face of the plate 252. The one end of the arm 256 carries a device 21 for exchanging the drill bit and the other end is pivotally connected to a piston rod 257 of a hydraulic cylinder 258. If the piston rod 257 is projected the center of the device 21 will move along the circle arc $L_2$ to the drill axis.

As may be seen in FIG. 13 the device 21 for exchanging a drill bit comprises an outer casing 259 and a basket 260 mounted therein. Three springs 261 arranged symmetrically around the basket extend between the bottom 262 of the casing and a thickened part 264 of the basket. The spring 261 is pushed on a rod 263 screwed into the thickened part 264. On the outside of the basket 260 there are flanges 265 and 266. A guiding rule 267 attached to the inside of the casing 259 extends between these flanges. The guiding rule 267 and the flanges 265 and 266 prevent the basket 260 from being turned relative to the casing 259. In the bottom of the basket 260 there are shoulders 268 intended for co-operation with a drill bit brought into the basket to prevent the drill bit from being turned relative to the basket. In the bottom of the basket and the casing respectively there are draining holes respectively 269 and 270. At the upper part of the basket 260 there is a flange 271 which extends along about half the circumference of the basket.

The arrangement according to the invention operates as follows. The rock drilling machine 15 is moved along the feed bar 14 to a position behind the drill rods 25 in the magazine. The transferring arm 26 is swung by the motor 59 towards the magazine at the same time as the rollers 74, 75 and 76, 77 respectively are moved away from each other by the cylinders respectively 78 and 79. The transferring arm stops when the rollers 84 and 85 come into contact with a rod 25. The rollers 74–77 are moved against the rod, which thereby is held by the gripping tongs formed by the above rollers. The transferring arm takes the rod in abovementioned manner to the drill axis. A device 21 for changing drill bits with a drill bit placed therein is swung to the drill axis. By rotating the inclined rollers 84 and 85 the rod 25 is screwed into the drill bit which is non-rotatably held by the bit exchanging device. During these operations the drill rod centralizer 20 is in a position above the bit exchanging devices and is locked in this position by means of the hydraulically operated lugs 290, which are movable in a direction perpendicular to the longitudinal direction of the feed bar 14 and which are intended for co-operation with the slide 205. When the drill bit has been screwed on, the rock drilling machine 15 is fed towards the rod 25 and its adapter is screwed into a coupling sleeve which in turn is already screwed on the rear end of the rod. The gripping tongs are opened and the transferring arm 26 is swung towards the magazine and stays there while gripping the rod coming next by the gripping tongs.

The rod 25 is drawn up by means of the rock drilling machine until the drill bit reaches the bit guide of the tube 201. The bit exchanging device 21 is now swung away from the drill axis. The jaws 209 and 210 in the drill rod centralizer 20 are brought together and the lugs 290 are moved out of engagement with the slide 205. The drill rod centralizer is now carried by the drill bit by the resting of the latter against the lower end face of the sleeve 224. The rock drilling machine is fed ahead until the drill rod centralizer with its flange 225 rests against the ground. By the fact that the whole drill rod centralizer with the bit guiding tube slides down to abutment against the ground, there is achieved an effective guiding of the bit during the collaring, by means of which the hole really gets the direction to which the feed bar has been adjusted. This fact makes possible that the collaring can be carried out with full efficiency independently of the nature of the ground. During collaring where the rock surface is covered by a loose overburden, a crater arises easily around the hole. In this case the bit guiding tube follows to the bottom of the crater and there guides the drill bit. If a great accuracy regarding direction and straightness of the hole is required the drill bit can be designed with an extended guiding length. The tube 223 of the drill rod centralizer is connected to a drill dust suction system (not shown). By the good ground contact and by the good accordance with the hole diameter of the drill bit guiding tube there is also achieved an effective removal of drill dust. During drilling, the jaws 209 and 210 will on the one hand guide the drill rod and on the other seal against a rearward blowing-out of the drill dust. The ring 222 contributes to a still improved sealing for the blowing-out of drill dust.

When the drill rod has been drilled down so far that the coupling sleeve 221 screwed on the rear end thereof has reached the sleeve 218, the drilling is broken off. The rock drilling machine is rotated in a reverse direction, and the adapter is screwed out of the coupling sleeve. A sleeve brake 151 placed on the slide of the rock drilling machine is swung automatically towards and against the sleeve 221 during the reverse rotation of the rock drilling machine. During the unscrewing of the adapter, the sleeve, then, will remain on the end of the drill rod. After the unscrewing of the adapter, the rock drilling machine is moved backwards along the feed bar to a position above the magazine member 24. After that the transferring arm 26 takes a new drill rod to the drill axis. When in alignment with the drill axis, the drill rod is screwed into the coupling sleeve on the rod next ahead by rotating the motors 82 and 83 of the gripping tongs. The string, being in the drill hole, is guided during the coupling by the jaws 209, 210. The adapter of the rock drilling machine is screwed into the coupling sleeve of the new drill rod and the transferring arm 26 is swung to the magazine where the tongs grip the rod coming next. The time during which the sleeve passes the jaws 209, 210 while being moved downwards, the jaws have to be opened. Sealing and guiding are then instead secured against the outer diameter of the sleeve by the fact that the fixed passages 224 and 218 respectively which are mounted respectively below and above the jaws have an inner diameter which is about equal to the outer diameter of the sleeve. The drilling continues until the desired hole depth is reached or until the drill bit because of wear has to be exchanged for a new one.

Before the drill string is drawn up out of the hole the threads incorporated in the string are shaken to come loose by the impactor of the rock drilling machine while the bit rests against the bottom of the hole. The drill rod centralizer 20 is drawn up along the feed bar by the resting of the coupling sleeve 221 against the underside of the jaws 209, 210 during the withdrawal of the string. The drill rod centralizer is kept in a drawn-up position by means of the hydraulically operated lugs 290. During the withdrawal, the jaws 209, 210 serve to grasp around and under the coupling sleeves 221 in order to hold the string in the hole. The transferring arm 26 is swung to the drill axis, where the tongs grip the rod, after which the adapter of the rock drilling machine is screwed out of the coupling sleeve of the uppermost drill rod, whereas the sleeve brake 151 safeguards that the sleeve remains on the rod. The rod is after that screwed out of the sleeve being in the drill rod centralizer 20 by means of the spinning device 27 and is transferred to the magazine. The axially affixed position of the drill rod centralizer has been arranged with respect to the bottom of the magazine so that the rod being unscrewed is at the right height. The rock drilling machine, then, is moved down and draws up the string another rod length, after which the next rod is unscrewed and is transferred to the magazine. The withdrawal of drill rods continues in the same way until only the last rod is left. This rod is drawn up by the rock drilling machine until the drill bit reaches the bit guiding tube 201. If the drill bit has to be exchanged, an empty bit exchanging device 21 is swung into the drill axis. The drill bit is brought down into the basket 260 of the bit exchanging device. The basket moves toward the bottom of the casing 259 while compressing the springs 261. The movement of the basket 260 continues until its flange 271 is brought to rest against the annular flange 225 of the drill rod centralizer. In certain cases, the drill bit is stuck so firmly that its thread has to be blown to come loose by means of the impactor of the rock drilling machine. In so doing, the basket 260 will form an anvil for the drill bit. The stresses on the bit exchanging device generated by the blows is transmitted to the drill rod centralizer via the flange 271 and is taken up by the lugs 290. Therefore, there is no risk of breaking the suspension of the casing 259. The adapter of the rock drilling machine is screwed out of the coupling sleeve, after which the spinning device 27 unscrews the drill rod from the drill bit. The bit exchanging device with the worn bit is swung aside and the other bit exchanging device with a sharpened bit is swung to the drill axis. The sharpened bit is screwed on the rod after which the string is assembled and a continued drilling is carried out.

If a joint in the string has not gotten loose, this one has to be broken manually. This system is economically the most advantageous provided that it is not frequently that manual breaking has to be resorted to. If necessary, however, the slide of the drill rod centralizer can be completed on the one hand with a couple of non-rotating jaws with a greater clamping capacity than the ones shown and gripping about the round drill rod below the coupling sleeve and on the other with a swingable and turnable pipe wrench, which grips about the round rod above the sleeve.

What we claim is:

1. An arrangement in drill rigs for moving drill string elements to and fro between a drill string element magazine and a drill string and for connecting and disconnecting, respectively, said drill string elements to and from said drill string comprising: an elongated support (14), a drilling machine (15) movably mounted on said support for reciprocal movement therealong, a plurality of drill string elements (25) for making up a drill string, a magazine (22, 23, 24) for storing said drill string elements, a device (26) for transferring a drill string element between said magazine and said drill string, means (27) on said transferring device for spinning a drill string element gripped thereby, said spinning means including gripping means for gripping said drill string element during transferring thereof and for axially displacing said drill string element during the spinning thereof so as to provide axial displacement of said drill string element during the connecting and disconnecting thereof.

2. In an arrangement in drill rigs for moving drill string elements provided with coupling threads to and fro between a drill string element magazine (22, 23, 24) and a drill string, an elongated support (14), an arm (56) swingably mounted at said support, power means (59) for swinging said arm, a spinning device (74, 75, 84) mounted at the free end of said arm for gripping and rotating a drill string element gripped thereby, said spinning device comprising mutually opposed rollers (74, 75, 84) adapted to rest against the drill string element at the gripping thereof, the axis of at least one of said rollers being inclined relative to the drill string to impart an axial displacement of a gripped drill string element during spinning thereof during connecting and disconnecting thereof.

3. An arrangement according to claim 2 comprising power means for rotating said spinning device about an axis substantially parallel to the axis of the drill string.

4. An arrangement according to claim 2 in which said spinning device comprises three rollers (74, 75, 84), one (84) of which is reversibly driven, the other rollers (74, 75) being swingably mounted for selective movement to and from a drill string element, and power means for swinging said other rollers to and from a drill string element when the drill string element is resting against said driven roller.

5. An arrangement according to claim 2 wherein said drill string element and said rollers contact each other along a contact surface which moves along a helical path on the periphery of said drill string element during the rotation thereof.

6. An arrangement according to claim 5 wherein the coupling threads of the drill string elements have given pitch angles, and wherein the axis of each of said rollers is inclined relative to the drill string, the angle between the axes of each of said rollers, respectively, and the axis of the drill string being substantially equal to the pitch angle of the thread of a drill string element.

7. In an arrangement in drill rigs for moving drill string elements provided with coupling threads of given pitch angles to and fro between a drill string element magazine and a drill string axis, an elongated support (14), a drilling machine (15) movably mounted on said support for reciprocal movement therealong, a magazine (22, 23, 24) fixedly mounted on said support for carrying a plurality of drill string elements (25) stacked therein in substantially parallel relation to said support, a first arm (56), means for swingably mounting said first arm to said support, said mounting means including power means (59) for swinging said first arm, a second arm (57) swingably mounted to said support, means (58) for interconnecting said first and second arms, a rectangular frame (66, 67, 68, 69) having at least a pair of free ends and disposed between said first and second arms, means including power means (72) for rotatably journalling said rectangular frame at the free ends thereof to said first and second arms, a spinning device for rotating a drill string element, said spinning device comprising a duality of gripping means (74, 75, 84; 76, 77, 83) disposed at opposed sides of said rectangular frame, each of said gripping means comprising three rollers, the axes of said rollers being inclined relative to the drill string axis, the angle between the axes of each of the rollers respectively and the drill string axis being equal to the pitch angle of the thread of a drill string element, one (84; 85) of said three rollers being reversibly driven, the other rollers being swingably mounted for selective movement to and from a drill string element when the drill string element is resting against said driven roller.

8. An arrangement according to claim 7 in which said magazine is arcuate, the drill string elements (25) are movable along an arc (L) with substantially the same radius as the arc of said magazine during the swinging of said first and second arms, control means (107–113) for controlling the swinging and rotating respectively of respectively said arms and said rectangular frame such that a drill string element is moved along an omegoid-shaped path during the transferring between said magazine and the drill string axis.

9. An arrangement according to claim 8 in which said control means comprise a third arm (107) limitedly swingably mounted on said second arm, a sensor device (113) mounted on at least one of said support and the one end of said third arm, means (112) on at least one of the one end of said third arm and said support and adapted to cover said sensor device after a given swinging of said second arm, said sensor device delivering a signal at the covering thereof, means responsive to said signal for stopping the swinging of said second arm and for starting the rotation of said frame, a first (110) and a second pin (111) fixedly mounted relative to said frame adapted to co-operate alternately with the other end of said third arm at the rotating of said frame for uncovering said sensor device, said sensor device delivering a further signal at the uncovering thereof, and means responsive to said further signal for starting a continued swinging of said second arm.

10. An arrangement according to claim 8 in which said magazine comprises at least two axially spaced magazine rack members (23, 24), a plurality of turnstiles (29) in each of said magazine members for separating two adjacent drill string elements (25), said turnstiles being rotatably journalled in said magazine members, said turnstiles being disposed alternately on the one side and the other respectively of an arcuate channel (28) from the opening to the bottom of said channel.

11. An arrangement according to claim 10 wherein said magazine comprises a plurality of shafts (41) rotatably journalled in said magazine rack members, one shaft for each of said turnstiles, wedge means (40) coupling each of said turnstiles to said shafts, a waved cam profile (51) provided with tops and bottoms in said magazine members for each of said turnstiles, said wedge means of each turnstile being adapted to slide along said cam profile at the rotating of said turnstiles for providing a locking thereof when said wedge means is disposed in a bottom of said waved cam profile.

12. Drill rod handling apparatus, for use with earth drilling machines, comprising: a magazine for storing drill rods, means for transferring a drill rod between said magazine and the drill axis, and means for connecting and disconnecting, respectively, said drill rod to and from a drill string by spinning said drill rod, said connecting and disconnecting means including means for gripping a drill rod during transferring thereof and for axially displacing a gripped rod by the spinning of said drill rod.

13. In an arrangement in drill rigs for connecting and disconnecting drill string elements movable to and fro between a drill string element magazine and a drill string axis, an elongated support (14), a drilling machine (15) movably mounted on said support for reciprocal movement therealong, a plurality of drill string elements (25) for making up a drill string, a drill string element storing magazine (22, 23, 24), means (26) for moving said drill string elements between said magazine and said axis, a drill string centralizing means (20) at the front end of said support for guiding the part of the drill string extending forwardly of said support, at least one jaw (209) in said centralizing means movably mounted towards and away from said drill string, said drill string being widened at the connections (221) between two consecutive drill string elements, and means for moving said centralizing means (20) axially along said support by said drill string during axial movement of said drill string, said moving means including means for bringing said at least one jaw towards and under said widened parts of the drill string.

14. An arrangement according to claim 13 in which the front part (201) of said drill string element centralizing means at the extreme forward position on said support extends forwardly of the support, said front part being tubular with substantially the same inner diameter as the outer diameter of a drill bit (19) carried by said drill string, said centralizing means including a further part (218) situated immediately before said at least one jaw, said further part being tubular with substantially the same inner diameter as the outer diameter of said widened parts of the drill string, and means (223) for removal of drilling dust connected between said tubular parts.

15. An arrangement in drill rigs for connecting and disconnecting drill string elements movable to and fro between a drill string element magazine and a drill string axis comprising an elongated support (14), a drilling machine (15) movably mounted on said support for reciprocal movement therealong, a drill string element storing magazine (22, 23, 24), a plurality of drill string elements (25) for making up a drill string, an adapter in said drilling machine for the connection thereof to said drill string [and for removing a drill string element from said drill string] a device (26) for moving said drill string elements between said magazine and said drill string axis, detachable coupling sleeves (221) for interconnecting two consecutive drill string elements, a brake (151) mounted on said drilling machine for non-rotatably holding said coupling sleeves, said brake being movable between an inactive position where it is out of engagement with said coupling sleeves of the drill string and an active position where it cooperates with said coupling sleeves of the drill string [for rotation between the held coupling sleeves and the uppermost drill string element], thereby insuring that the coupling sleeve on the drill string element nearest to said drilling machine remains on that drill string element when said adapter is disconnected therefrom.

16. An arrangement according to claim 15 in which said brake comprises an arm (161) pivotally attached to said drilling machine, two legs (152, 153) swingably mounted on the outer end of said arm and adapted to rest against opposed sides of a coupling sleeve when the brake is in its active position, a shaft (158) extending between and past said legs, stop means (159, 160) on the outer ends of said shaft, and springs (156, 157) mounted on said shaft between said stop means and said legs for biasing said legs towards each other.

17. In an arrangement in drill rigs for moving drill string elements provided with coupling threads of given pitch angles to and fro between a drill string element magazine (22, 23, 24) and a drill string, an elongated support (14), an arm (56) swingably mounted to said support, power means (59) for swinging said arm relative to said support, a spinning device (74, 75, 84) mounted at the free end of said arm for gripping and rotating a drill string element gripped thereby, said spinning device comprising mutually opposed rollers (74, 75, 84) adapted to rest against the drill string element at the gripping thereof, said rollers being mounted with their axes inclined at given angles to the axis of the drill string, said angles being substantially the same as the pitch angle of the coupling thread of a drill string element.

18. An arrangement according to claim 17 in which said spinning device comprises three rollers (74, 75, 84), one (84) of which is reversibly driven, the other rollers (74, 75) being swingably mounted for relative movement to and from a drill string element, and power means for swinging said other rollers to and from a drill string element when the drill string element is resting against said driven roller.

19. An arrangement according to claim 17, comprising power means (72) for rotating said spinning device about an axis substantially parallel to the axis of the drill string.

20. An arrangement according to claim 19 in which said magazine is arcuate, the drill string elements (25) are movable along an arc (L) with substantially the same radius as the arc of said magazine during the swinging of said arm, control means (107–113) for controlling the swinging and rotating respectively of respectively said arm and said spinning device such that a drill string element is moved along an omegoid-shaped path during the transferring between said magazine and the drill string axis.

*21. An arrangement in drill rigs for connecting and disconnecting drill string elements movable to an fro between a drill string element magazine and a drill string axis, comprising an elongate support, a drilling machine (15) mounted to said support for reciprocal movement along said support, a plurality of drill string elements (25) for making up a drill string, an adapter in said drilling machine for the connection thereof to said drill string for rotating said drill string, detachable coupling sleeves (221) for interconnecting both said adapter and a first drill string element nearest to said drilling machine and two consecutive drill string elements, a brake (151) mounted on said drilling machine for movement in common with said drilling machine along said support, said brake non-rotatably holding a first coupling sleeve interconnecting said adapter and said first drill string element during a disassembly of said drill string, said brake (151) being movable between an inactive position where it is out of engagement with said first coupling sleeve and an active position where it cooperates with said first coupling sleeve, thereby insuring that said first coupling sleeve on said first drill string element remains on said first drill string element when said adapter is disconnected therefrom.*

*22. An arrangement according to claim 21 in which said brake comprises an arm (161) pivotally attached to said drilling machine, two legs (152, 153) swingably mounted on the outer end of said arm and adapted to rest against opposed sides of a coupling sleeve when the brake is in its active position, and biasing means (156, 157) for biasing said legs toward each other in order to non-rotatably hold said coupling sleeve.*

* * * * *